G. F. CONLEY.
PNEUMATIC PLUG.
APPLICATION FILED DEC. 23, 1914.

1,158,108.

Patented Oct. 26, 1915.

Witnesses:

Inventor
George F. Conley

UNITED STATES PATENT OFFICE.

GEORGE F. CONLEY, OF CHICAGO, ILLINOIS.

PNEUMATIC PLUG.

1,158,108.  Specification of Letters Patent.  Patented Oct. 26, 1915.

Application filed December 23, 1914.  Serial No. 878,731.

*To all whom it may concern:*

Be it known that I, GEORGE F. CONLEY, a citizen of the United States, residing at Chicago, in the county of Cook and State of Illinois, have invented a new and useful improvement in devices which I choose to call pneumatic plugs for the prevention of the escape of air through accidentally-produced perforations, commonly known as punctures and occurring in the walls of flexible air-containers, such as the inner tubes of pneumatic tires and single-tube pneumatic tires—such as are used on the wheels of automobiles, motor-cycles, bicycles, &c.—and other air-containers, such as air-cushions and similar devices.

My invention refers in particular to such leak preventing devices used with the first named class of air containers, namely,—the inner tubes of pneumatic tires and to such a device having parts so shaped and constructed of such materials that the air pressure within the inner tube acting on or within, or both on and within the device, or the pressure of the casing or rim, in combination with the pressure in the tube acting on the device, make the device effective in its purpose.

Figure 1:
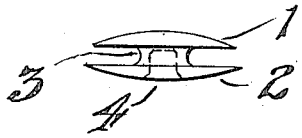
Figure 1:
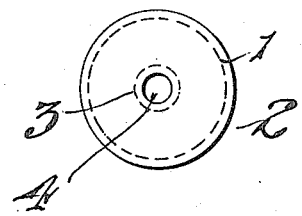
Figure 2:
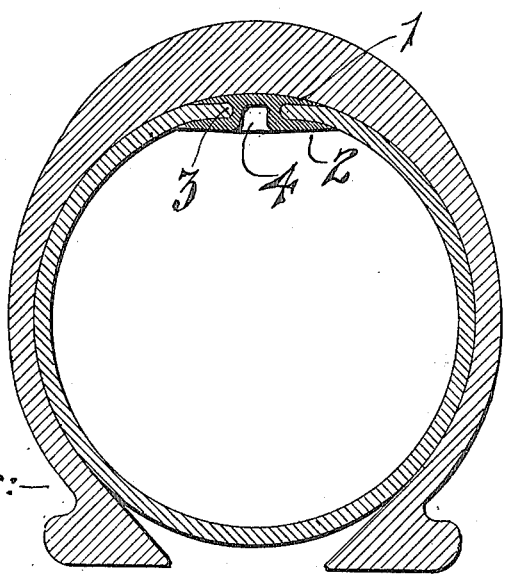

Figure 1, shows a plan view and an elevation of the device herein referred to. Fig. 2 shows a cross section of the inner tube of a pneumatic tire, and the casing thereof and of a device embodying this invention joined thereto.

This device is constructed of a flexible, elastic material such as rubber and consists essentially of two flanges 1 and 2 (see Fig. 1) affixed to and connected by the neck 3, of lesser diameter than either of the flanges. This neck 3 has a cavity or recess 4 within it, which extends through the flange 2 but does not extend through the flange 1. The distance between the flanges approximates the thickness of an inner tube.

The use of the device just described is as follows:—When a puncture has been produced in an inner tube, said hole or puncture is made round by cutting some of inner tube away and is made of such a diameter that when the said device is put in place as hereafter described, the sides of the hole will fit snugly about the neck 3 of the device (see Fig. 2.) The device is inserted in the hole in the inner tube by forcing flange 2 (Fig. 2.) through the hole. Next the inner tube is partially inflated in the usual manner, then replaced in the outer casing and inflated to a working pressure. The device will now prevent the escape of air through the hole in the inner tube as follows:—Being flexible, flange 2 is pressed tightly against the inner tube by the air pressure within the tube. This pressure is transmitted to flange 1, and forces it tightly against the inner side of the outer casing. Now although the hole in the tube is made of such a diameter that when the tube is not inflated the sides of the hole will fit snugly about the neck 3 of the device, it occurs that when the tube is inflated, there may be a deformation of the hole in the inner tube and a tendency toward the pulling away of the sides of the hole from the neck 3 of the device. To counteract this tendency, the cavity 4 Fig. 1 and Fig. 2 is used. The air within cavity 4 presses outwardly against the walls of the neck 3 and forces said walls out to conform to and follow up any deformation in the shape of the hole in the inner tube, thereby insuring at all times a snug fit of the neck 3 in the hole.

Having thus described one of the principal types of my invention, what I claim is:—

1. A pneumatic plug consisting of disks and a hollow neck integral with and connecting said disks, one of said disks provided with an aperture communicating with the interior of said neck, said plug being made of material impervious to air and the wall of said neck being made of yielding material adapted to expand by fluid pressure in said interior and an air containing tube of elastic material impervious to air, and having a puncture through the wall thereof, said plug adapted to be joined to said tube, with said neck in said puncture and said aperture in communication with the interior of said tube.

2. A pneumatic plug consisting of disks and a hollow neck integral with and connecting said disks, one of said disks provided with an aperture the wall whereof is a continuation of the wall of the interior of said hollow neck, said plug being made of material impervious to air and of yielding material, whereby said neck is adapted to yield on fluid pressure being applied thereto and said apertured disk is adapted to be forced toward the remaining disk on fluid pressure being applied on the outer face thereof and an air containing tube, of elastic material, having a puncture in the wall thereof, said plug adapted to be applied to said tube to close said puncture, with the aperture in said plug opening inward to said tube.

3. A pneumatic plug consisting of disks and a hollow neck integral with and connecting said disks, one of said disks provided with an aperture the wall whereof is a continuation of the wall of the interior of said hollow neck, in combination with an air containing tube, said plug and tube joined with said aperture in communication with the interior of said tube, and said plug and tube made of material impervious to air and adapted to yield on fluid pressure being applied thereto within said tube.

GEORGE F. CONLEY.

Witnesses:
C. W. Morgan,
Wm. E. Morgan.